United States Patent [19]
Friedman et al.

[11] Patent Number: 5,947,648
[45] Date of Patent: Sep. 7, 1999

[54] TOOLHOLDER ASSEMBLY

[75] Inventors: Yacob Friedman; Jerrold Robin, both of Kfar Vradim, Israel

[73] Assignee: Iscar Ltd., Migdal Tefen

[21] Appl. No.: 08/897,595

[22] Filed: Jul. 21, 1997

[30] Foreign Application Priority Data

Aug. 5, 1996 [IL] Israel ........................................ 119007

[51] Int. Cl.[6] ................................................... B23B 29/04
[52] U.S. Cl. .................................. 407/5; 407/6; 407/107; 407/109
[58] Field of Search ............................... 407/107, 5, 108, 407/109, 110, 120, 100, 3, 4, 6

[56] References Cited

U.S. PATENT DOCUMENTS

| | | | |
|---|---|---|---|
| 2,181,023 | 11/1939 | Moore . | |
| 2,659,963 | 11/1953 | Severson | 407/6 |
| 2,955,349 | 10/1960 | York | 407/5 |
| 3,059,316 | 10/1962 | Bader et al. | 407/5 X |
| 3,193,909 | 7/1965 | Mihic | 407/4 |
| 3,281,920 | 11/1966 | Eriksson | 407/3 |
| 3,775,817 | 12/1973 | Hertel | 407/5 |
| 4,414,870 | 11/1983 | Peterson, Jr. et al. | 407/109 X |

FOREIGN PATENT DOCUMENTS

| | | |
|---|---|---|
| 1 303 057 | 1/1963 | France . |
| 2 155 530 | 5/1973 | France . |

OTHER PUBLICATIONS

Dr. H. Frommelt, Applications of Ferro–Damp cutting–off tools with throw–away tungsten carbide tips, Apr. 3, 1963, p. 774.

*Primary Examiner*—Andrea L. Pitts
*Assistant Examiner*—Henry W. H. Tsai
*Attorney, Agent, or Firm*—Pennie & Edmonds LLP

[57] ABSTRACT

A toolholder assembly includes a holder blade having an upper clamping jaw and a lower base jaw defining therebetween an insert receiving slot for releasably retaining a cutting insert therein. The upper clamping jaw has an upper surface disposed apart from the insert receiving slot and formed with a recess towards its front end. A wear resistant shield insert is releasably retained within the recess and has an upper surface substantially flush with the front end's upper surface.

18 Claims, 3 Drawing Sheets

1

TOOLHOLDER ASSEMBLY

FIELD OF THE INVENTION

The present invention relates to toolholder assemblies of the so-called "wedge clamping" or "spring clamping" types including a holder blade whose integrally formed upper clamping jaw and lower base jaw define therebetween an insert receiving slot in which a cutting insert is releasably retained therein in general and whose upper clamping jaw's front end is fitted with an exchangeable hard material shield insert for protecting it against wear in particular.

BACKGROUND OF THE INVENTION

Toolholder assemblies of the so-called "wedge clamping" or "spring clamping" types are employed for single point operations, for example, grooving and parting off, during which time the inclined front end of a holder blade's upper clamping jaw positioned to the rear of a cutting insert's front cutting edge is subject to considerable abrasive wear by chips curling up thereagainst. Such wear poses a considerable danger both to an operator and the tool environment by virtue of the fact that the snapping off of an upper clamping jaw's front portion acting to retain a cutting insert would catapult it and the hitherto retained cutting insert at substantially the peripheral velocity of a rotating workpiece. In view of this danger, for the purpose of safety, holder blades are replaced at relatively frequent intervals which could otherwise be considerably extended were the abrasive wear of their upper clamping jaw's front end be inhibited.

One approach employed to extend the working life of a holder blade is to braze a wear resistant shield onto its upper clamping jaw's front end, the wear resistant shield being made of a suitable material considerably harder than the holder blade's base metal. However, this approach suffers from the disadvantage that the replacement of a worn shield is a relatively cumbersome process which can be itself injurious to a holder blade when not performed under highly rigorous conditions.

SUMMARY OF THE INVENTION

It is an object of the present invention to provide a toolholder assembly including a holder blade whose upper clamping jaw and lower base jaw define therebetween an insert receiving slot in which a cutting insert is releasably retained therein and whose upper clamping jaw's front end is fitted with an exchangeable wear resistant shield insert for extending the holder blade's working life whilst maintaining rigorous safety levels.

In accordance with the teachings of the present invention there is provided a toolholder assembly comprising: a holder blade having an upper clamping jaw and a lower base jaw defining therebetween an insert receiving slot for releasably retaining a cutting insert therein, said upper clamping jaw having an upper surface disposed apart from said insert receiving slot, said upper surface being formed with a recess towards its front end; and a wear resistant shield insert releasably retained within said recess and having an upper surface substantially flush with said front end's upper surface.

A shield insert and a holder blade's recess are so shaped and dimensioned that the shield insert's upper surface effectively replaces the hitherto affected contact area of the upper clamping jaw's upper surface. At the same time, the recess has a relatively shallow depth relative to the principal section depth of the upper clamping jaw's front end so as not to inherently weaken the same, the principal section depth being defined in a direction substantially co-directional to the direction of the principal cutting forces.

In one preferred embodiment of the present invention, a shield insert is releasably retained in a recess by a clamping screw or similar clamping means. Alternatively, in a second preferred embodiment of the present invention, a shield insert and a recess are each provided with suitable engagement surfaces for the sliding insertion of a shield insert into a recess and its subsequent withdrawal therefrom. Such engagement surfaces can be in the form of, for example, a dovetail configuration, a T-slot configuration, and the like.

A shield insert typically requires a greater thickness in the former construction relative to the latter construction so as to accommodate a clamping screw's head. However, the depth of a recess in which it is to be seated is preferably not correspondingly increased in order not to unduly weaken a holder blade's front end for the same principal section depth, thereby resulting in that a shield insert's upper surface is raised relative to the front end's upper surface. In this case, the shield insert is preferably chamfered around its upper edges, thereby enabling chips to smoothly ride up thereon during a chip forming process.

Thus, the purpose of extending a holder blade's working life is readily achieved in accordance with the teachings of the present invention by, on the one hand, substantially eliminating abrasion of its upper clamping jaw's front end by chips formed during grooving or parting off operations, and, on the other hand, by the ready replacement of a worn shield insert preferably formed from material which is substantially harder than a holder blade's base metal, for example, cemented carbide, and therefore better suited to act as a holder blade's effective chip diverter.

BRIEF DESCRIPTION OF THE DRAWINGS

For a better understanding of the invention and to show how the same may be carried out in practice, by way of non-limiting example only, reference will now be made to the accompanying drawings, in which.

DETAILED DESCRIPTION OF THE INVENTION

Figure 1:
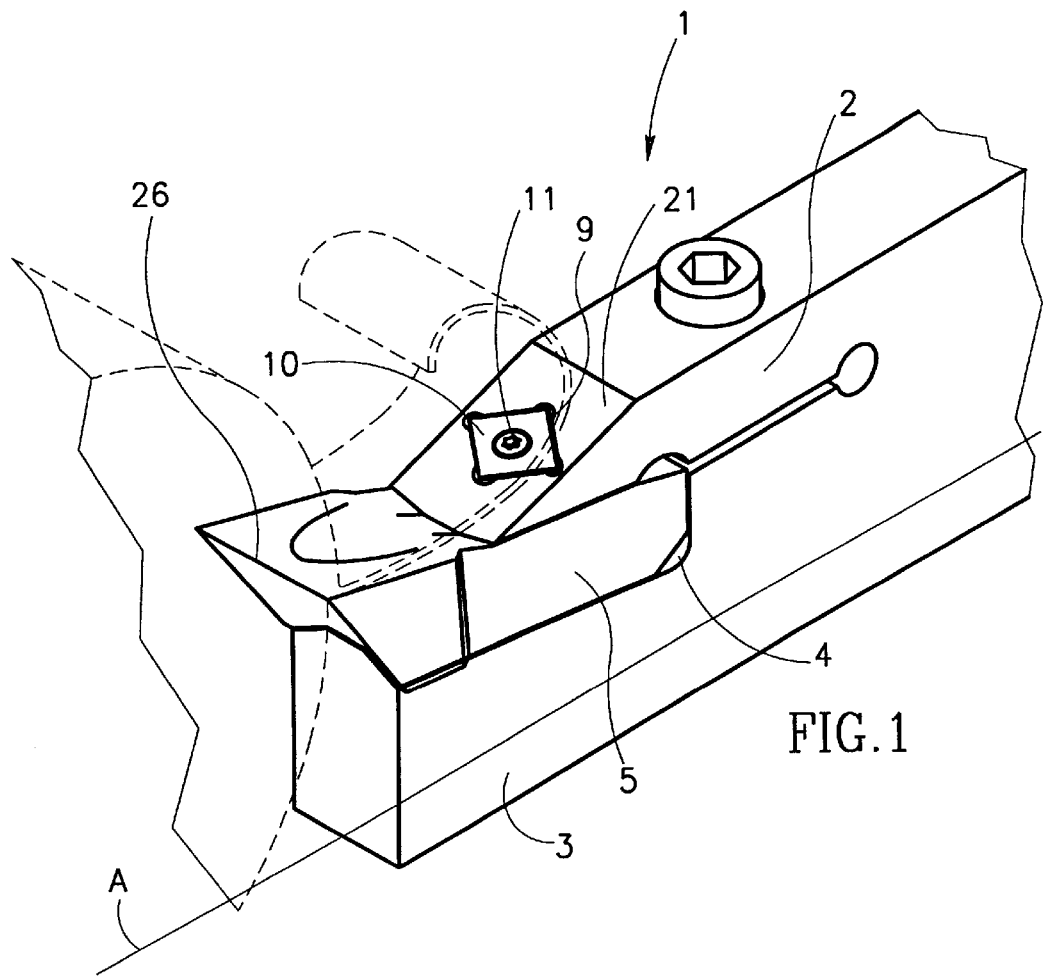
FIG. 1 is an isometric view of a first embodiment of a toolholder assembly in accordance with the teachings of the present invention during a chip forming operation.
Figure 2:
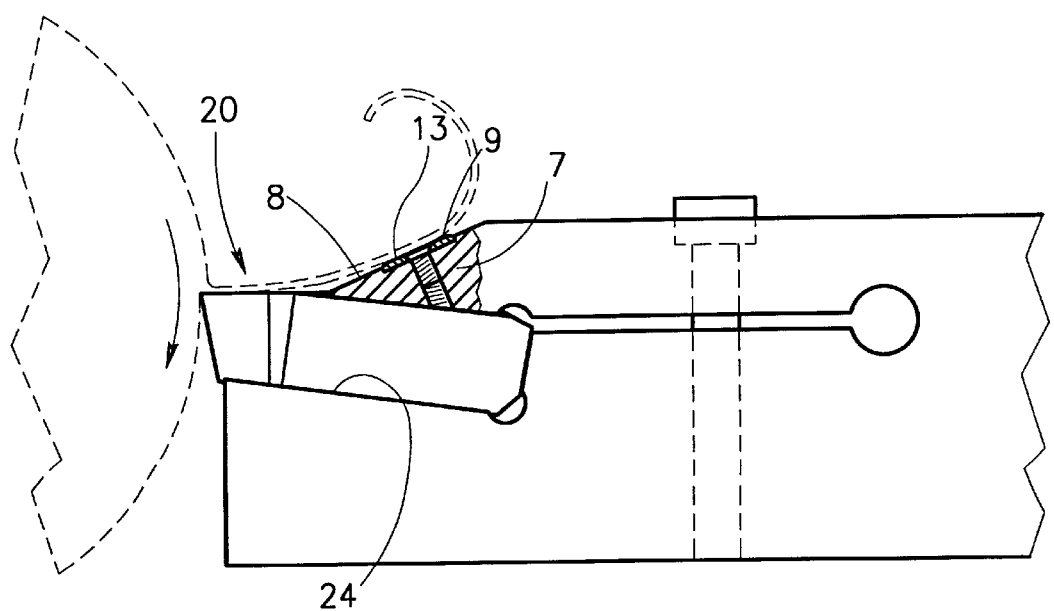
FIG. 2 is a side partially cut-away view of the holder blade of the toolholder assembly of FIG. 1.

With reference now to FIGS. 1 and 2, a holder blade 1 includes, at a leading end 20 thereof an integrally formed upper clamping jaw 2 and a lower base jaw 3 defining therebetween an insert receiving slot 4 in which a cutting insert 5 is releasably retained therein. As seen in FIG. 2, the cutting insert 5 is retained between an upper cutting insert abutment surface 22 formed on the underside of the upper clamping jaw 2 and a lower cutting insert abutment surface 24 formed on the topside of the lower base jaw 3. The cutting insert's front cutting edge 26 is positioned at the holder blade's leading end 20 and is substantially perpendicular to a longitudinal axis A of the holder blade 1 so as to facilitate grooving and parting-off operations. The upper clamping jaw 2 has an inclined front end 7 with an upper surface 8 in which a diamond shaped recess 9 is formed. The upper surface 8 of the upper clamping jaw's inclined front end 7 slopes, in the direction of the leading end 20 of the holder blade 1, towards the upper cutting insert abutment surface 22.

As seen in FIG. 2, during cutting operations, the upper surface 8 serves as a chip deflector surface with the recess 9 occupying only a first portion thereof, a second portion 21 of the chip deflector surface being free of any such recess. A wear resistant, cemented carbide shield insert 10 is shaped and dimensioned so as to be received within the recess 9 and clamped therein by a clamping screw 11 which passes through the thickness of the shield insert 10 and enters into holder blade's front end 7. The shield insert 10 has a slightly greater thickness than the depth of the recess 9 such that its upper surface 13 is slightly raised relative to the front end upper surface 8. To ensure a smooth merging between the upper surfaces 13 and 8, the shield insert's upper edges are preferably chamfered.

The disposition of the shield insert 10 is such that it effectively acts as a chip diverter for chips which curl up thereagainst as they are formed during a grooving or parting off operation, thereby eliminating the abrasive wear which hitherto occurred of the upper clamping jaw's front end 7.

Figure 3:
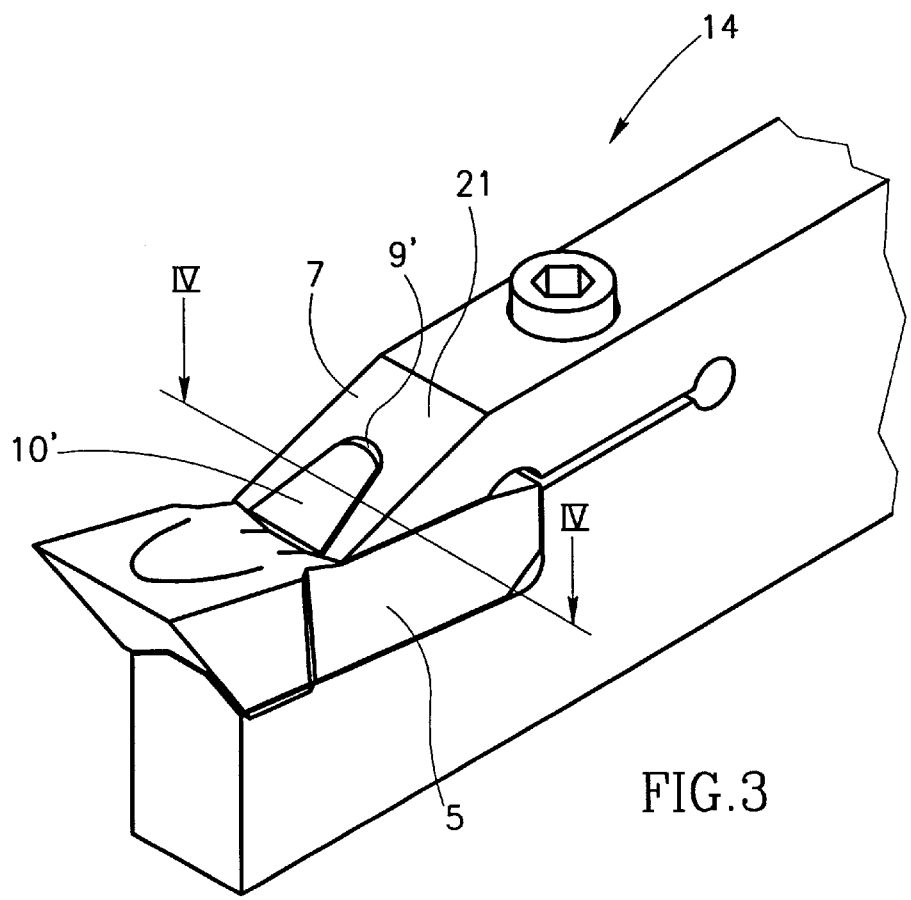
FIG. 3 is an isometric view of a second embodiment of a toolholder assembly in accordance with the teachings of the present invention.
Figure 4:
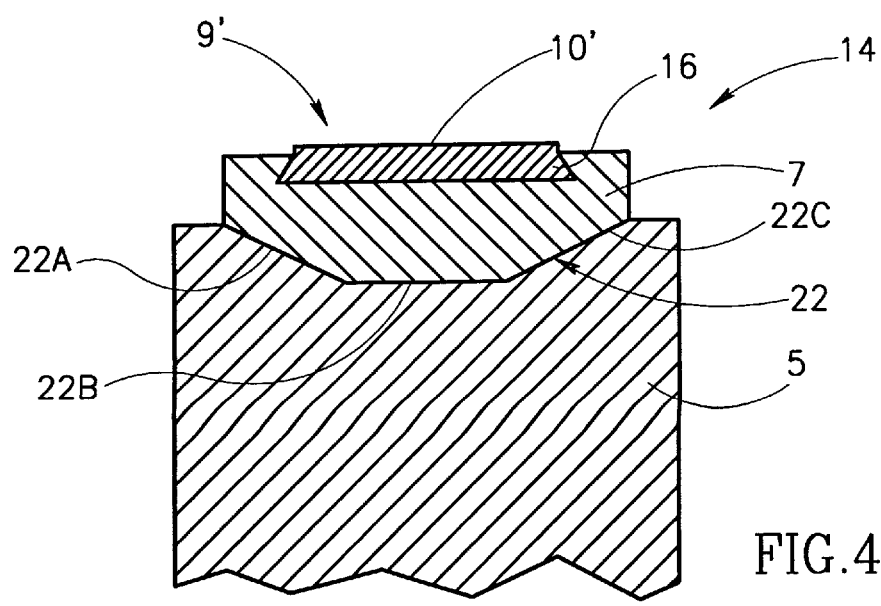
FIG. 4 is a cross sectional view of the holder blade of the toolholder assembly of FIG. 3 along line IV—IV.
Figure 5:
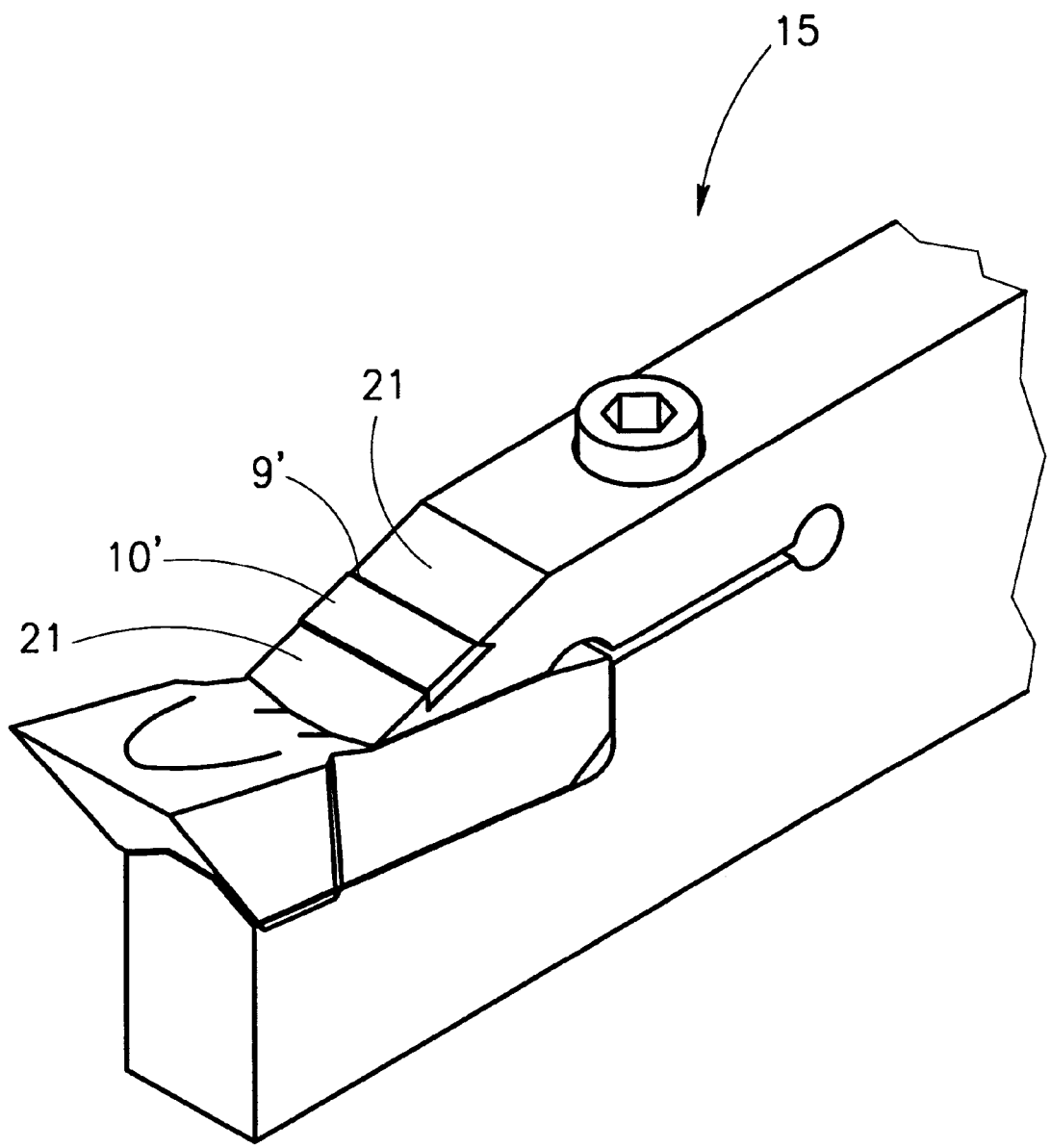
FIG. 5 is an isometric view of a third embodiment of a toolholder assembly in accordance with the teachings of the present invention.

Rather than a shield insert 10 being screw clamped in a recess 9, alternatively, a shield insert 10' can be slidingly inserted into a recess 9' as depicted in the holder blades 14 and 15 respectively shown in FIGS. 3, 4 and 5. In both cases, the recess 9' and the shield insert 10' are formed with matching dovetail surfaces 16, however, in the former case, the direction of sliding insertion into and withdrawal from the recess 9' is substantially co-directional to the holder blade's longitudinal axis whilst, in the latter case, the direction of sliding insertion into and withdrawal from the recess 9' is substantially transverse to the holder blade's longitudinal axis. Thus, in FIG. 3, the long dimension of the recess is substantially co-directional with said longitudinal axis, while in FIG. 5, the long dimension of the recess is substantially transverse to said longitudinal axis.

As best seen in FIG. 4, the upper cutting insert abutment surface 22 formed on the underside of front end 7 is preferably non-planar, comprising component surfaces 22a, 22b and 22c which abut complementary surfaces formed on the cutting insert 5. Also, as seen in FIGS. 3 and 4, the front cutting edge 26 of the cutting insert 5, and the portion of the cutting insert which is beneath the front end 7, are wider than the front end.

While the invention has been described with respect to a limited number of embodiments, it will be appreciated that many variations, modifications and other applications of the invention may be made, for example, rather than a holder blade having an integrally formed upper clamping jaw and lower base jaw, alternatively, an upper clamping jaw can be formed as a discrete member which is releasably clamped to a base jaw.

We claim:

1. A toolholder assembly for grooving and parting-off applications, the toolholder assembly comprising:
   a one-piece holder blade releasably retaining a cutting insert having a front cutting edge,
   said holder blade having a longitudinal axis perpendicular to, and a leading portion narrower than, the cutting insert's front cutting edge,
   said holder blade having a clamping jaw tapering in a direction of a leading end of the holder blade, said clamping jaw having a chip deflector surface,
   characterized in that
   said chip deflector surface is formed with a shallow recess constituting a small portion thereof towards said leading end, said shallow recess being shaped and sized to releasably receive a generally planar wear resistant shield insert therewithin, the shield insert having an upper surface which is substantially flush with said chip deflector surface so as to not disrupt normal chip evacuation during said grooving and parting-off applications, wherein said shield insert is screw clamped in said recess by means of a screw which passes through said shield insert and enters into said holder blade.

2. An assembly according to claim 1 wherein said shield insert is fabricated from cemented carbide.

3. An assembly according to claim 1, wherein said recess is spaced apart from said leading end.

4. A toolholder assembly for grooving and parting-off applications, the toolholder assembly comprising:
   a one-piece holder blade releasably retaining a cutting insert having a front cutting edge,
   said holder blade having a longitudinal axis perpendicular to, and a leading portion narrower than, the cutting insert's front cutting edge,
   said holder blade having a clamping jaw tapering in a direction of a leading end of the holder blade, said clamping jaw having a chip deflector surface,
   characterized in that
   said chip deflector surface is formed with a shallow recess constituting a small portion thereof towards said leading end, said shallow recess being shaped and sized to releasably receive a generally planar wear resistant shield insert therewithin, the shield insert having an upper surface which is substantially flush with said chip deflector surface so as to not disrupt normal chip evacuation during said grooving and parting-off applications, wherein said recess is formed with dovetailed sidewalls for sliding insertion thereinto and withdrawal therefrom, of a wear resistant shield insert.

5. An assembly according to claim 4, wherein a long dimension of said recess is substantially transverse to said longitudinal axis.

6. An assembly according to claim 4, wherein a long dimension of said recess is substantially co-directional with said longitudinal axis.

7. The assembly according to claim 4, wherein said shield insert is fabricated from cemented carbide.

8. The assembly according to claim 4, wherein said recess is spaced apart from said leading end.

9. A one-piece holder blade for use with a toolholder assembly configured for grooving and parting-off applications, said holder blade comprising:
   a clamping jaw tapering in a direction of a leading end of the holder blade, said clamping jaw having a chip deflector surface, said chip deflector surface being provided with a shallow recess constituting a small portion thereof towards said leading end, said shallow recess being shaped and sized to releasably receive a generally planar wear resistant shield insert having an upper surface which is substantially flush with said chip deflector surface so as to not disrupt normal chip evacuation during said grooving and parting-off applications, wherein said shield insert is screw clamped in said recess by means of a screw which passes through said shield insert and enters into said holder blade.

10. A toolholder assembly for grooving and parting-off applications, said toolholder assembly comprising:

a one-piece holder blade having a longitudinal axis and being provided with an upper clamping jaw integrally formed with a lower base jaw, said jaws defining therebetween an insert receiving slot proximate to a leading end of said holder blade, said upper clamping jaw tapering in a direction of said leading end and being provided with a chip deflector surface which slopes, in the direction of said leading end, towards a cutting insert abutment surface formed on the upper clamping jaw, a first portion of said chip deflector surface being provided with a recess; and a wear resistant shield insert releasably retained in said recess, said shield insert having an upper surface which is substantially flush with a second portion of said chip deflector surface so as not to disrupt normal chip evacuation during said grooving and parting-off applications, wherein the shield insert is releasably retained in the recess by means of a screw which passes through the shield insert and enters into the holder blade.

11. The toolholder assembly of claim 10, wherein said shield insert has a slightly greater thickness than a depth of said recess such that the upper surface of said shield insert is slightly raised relative to said second portion of said chip deflector surface, and upper edges of the shield insert are chamfered to thereby provide a smooth merging between the upper surface of the shield insert and said second portion of said chip deflector surface.

12. The toolholder assembly of claim 10, wherein the recess is spaced apart from said leading end by a portion of said chip deflector surface.

13. A toolholder assembly for grooving and parting-off applications, said toolholder assembly comprising:

a one-piece holder blade having a longitudinal axis and being provided with an upper clamping jaw integrally formed with a lower base jaw, said jaws defining therebetween an insert receiving slot proximate to a leading end of said holder blade, said upper clamping jaw tapering in a direction of said leading end and being provided with a chip deflector surface which slopes, in the direction of said leading end, towards a cutting insert abutment surface formed on the upper clamping jaw, a first portion of said chip deflector surface being provided with a recess; and a wear resistant shield insert releasably retained in said recess, said shield insert having an upper surface which is substantially flush with a second portion of said chip deflector surface so as not to disrupt normal chip evacuation during said grooving and parting-off applications, wherein the recess is provided with at least one dovetailed edge for sliding insertion of the shield insert into said recess.

14. The toolholder assembly of claim 13, wherein a long dimension of said recess is substantially transverse to the longitudinal axis of the holder blade.

15. The toolholder assembly of claim 13, wherein a long dimension of said recess is substantially co-directional with the longitudinal axis of the holder blade.

16. The toolholder assembly of claim 13, wherein said shield insert has a slightly greater thickness than a depth of said recess such that the upper surface of said shield insert is slightly raised relative to said second portion of said chip deflector surface, and upper edges of the shield insert are chamfered to thereby provide a smooth merging between the upper surface of the shield insert and said second portion of said chip deflector surface.

17. The toolholder assembly of claim 13, wherein the recess is spaced apart from said leading end by a portion of said chip deflector surface.

18. A one-piece holder blade for use with a toolholder assembly configured for grooving and parting-off applications, said holder blade comprising:

a clamping jaw tapering in a direction of a leading end of the holder blade, said clamping jaw having a chip deflector surface, said chip deflector surface being provided with a shallow recess constituting a small portion thereof towards said leading end, said shallow recess being shaped and sized to releasably receive a generally planar wear resistant shield insert having an upper surface which is substantially flush with said chip deflector surface so as to not disrupt normal chip evacuation during said grooving and parting-off applications, wherein said recess is formed with dovetailed sidewalls for sliding insertion thereinto and withdrawal therefrom, of a wear resistant shield insert.

* * * * *